(12) United States Patent
Kramer et al.

(10) Patent No.: US 10,078,654 B2
(45) Date of Patent: Sep. 18, 2018

(54) DATA LOGGING FRAMEWORK

(71) Applicant: Facebook, Inc., Menlo Park, CA (US)

(72) Inventors: Adam D. I. Kramer, San Francisco, CA (US); Itamar Rosenn, San Francisco, CA (US); Thomas M. Lento, Menlo Park, CA (US); John Paul Costella, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 753 days.

(21) Appl. No.: 14/218,323

(22) Filed: Mar. 18, 2014

(65) Prior Publication Data

US 2015/0269212 A1  Sep. 24, 2015

(51) Int. Cl.
*G06F 17/30* (2006.01)

(52) U.S. Cl.
CPC .............................. *G06F 17/30368* (2013.01)

(58) Field of Classification Search
None
See application file for complete search history.

(56) References Cited

U.S. PATENT DOCUMENTS

| | | | | |
|---|---|---|---|---|
| 6,862,711 B1* | 3/2005 | Bahrs | ........................ | G06F 8/38 715/205 |
| 2003/0055809 A1* | 3/2003 | Bhat | ................. | G06F 17/30368 |
| 2003/0144868 A1* | 7/2003 | MacIntyre | ........ | G06F 17/30536 705/7.38 |
| 2005/0223283 A1* | 10/2005 | Frey | ...................... | G06F 11/366 714/20 |
| 2007/0050420 A1* | 3/2007 | Sankruthi | ......... | G06F 17/30563 |
| 2007/0294268 A1* | 12/2007 | Belyy | ............... | G06F 17/30569 |
| 2010/0150326 A1* | 6/2010 | Nuestro | ................... | H04M 3/36 379/93.17 |
| 2010/0198947 A1* | 8/2010 | Daughtery | .............. | G06F 9/541 709/221 |
| 2010/0274813 A1* | 10/2010 | Lu | ....................... | G06F 17/3056 707/792 |
| 2011/0113436 A1* | 5/2011 | Pal | ...................... | G06F 11/2094 719/328 |
| 2012/0310905 A1* | 12/2012 | Hans | ................. | G06F 17/30507 707/694 |
| 2014/0156618 A1* | 6/2014 | Castellano | ........ | G06F 17/30587 707/703 |

* cited by examiner

*Primary Examiner* — James Trujillo
*Assistant Examiner* — Aida Z Tessema
(74) *Attorney, Agent, or Firm* — FisherBroyles, LLP

(57) ABSTRACT

A data-logging framework ("logger") includes a configuration file in which an application can define various data fields and locations at which the data fields are to be logged. Some data fields include validating functions that are used by the logger to determine whether a value of a data field is valid. The application can also define (a) canonical data fields using the logger and (b) derived data fields. Upon receiving the data fields and their values from the application, the logger can determine whether the data fields are defined in the configuration file, validate the values, and log the values at the specified locations. Values of any canonical and/or derived data fields are obtained by the logger and logged at the specified locations.

20 Claims, 10 Drawing Sheets

DATA LOGGING FRAMEWORK

TECHNICAL FIELD

Several of the disclosed embodiments relate to logging data, and more particularly, to a data-logging framework that facilitates logging data in a structured manner.

BACKGROUND

Current data-logging techniques generally require a framework for logging data. If a system executes multiple applications, then each of the applications can have their own framework. For example, each of the applications would create tables or files that can store data in one or more formats, and the formats can differ between applications. Moreover, different applications can use different names for logging identical or similar data. For example, one application may log a user's name whereas a different application may log the user's identifier. Applications may also use different fieldnames for data. For example, an application, "App A" in the system can log an identification (ID) of a user as "ID No." and another application, "App B" can log the same user ID as "User ID." Conversely, the applications can use the same names to log data that can mean different things. For example, the "App A" can log an ID of a device as "ID No." and the "App B" can log a user ID as "ID No.". These inconsistencies can create problems in analyzing and understanding the logged data.

Further, current data logging techniques generally lack error handling and/or data validation capabilities. They do not ensure that data being logged for a particular field is valid. For example, they may not validate that a date of birth is logged (accidentally) in place of a gender for a gender field. Furthermore, current data logging techniques sometimes require applications to create and maintain the infrastructure necessary for logging the data. This can not only give rise to potential data inconsistency problems which might evade notice, but also create a significant overhead for the system in terms of computing resources, e.g., space and processor time. If there are multiple applications in the system, each of them can consume computing resources to create and maintain the necessary infrastructure.

DETAILED DESCRIPTION

Figure 1:
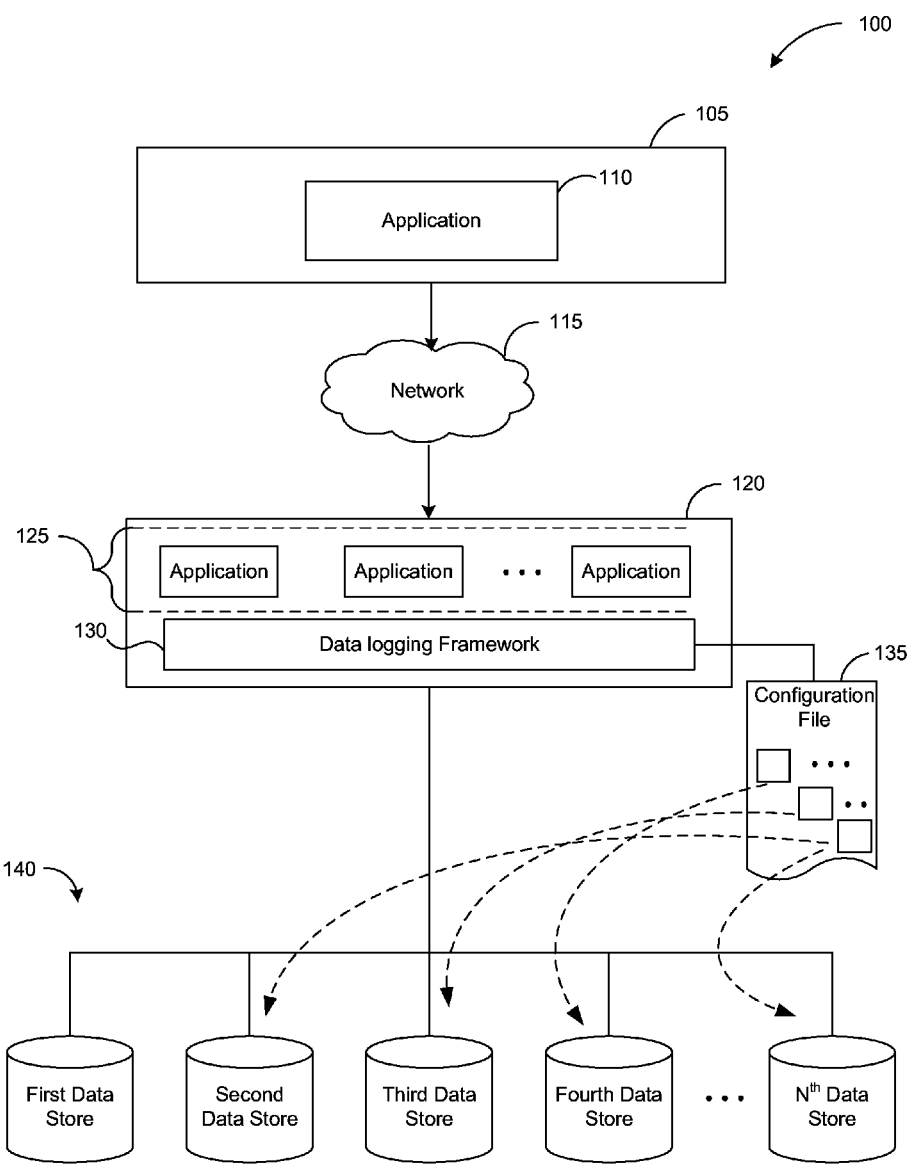
FIG. 1 is a block diagram illustrating an environment in which a data logging framework ("logger") can be implemented.

Technology is disclosed for logging data using a data-logging framework ("the technology"). The data-logging framework (hereinafter referred to as "logger") can be used by one or more applications for logging data in a structured manner. Various embodiments of the logger provide features including schema level validation, field validation, routing of values of data fields to different data stores, error handling, sampling and gating of log data and seamless integration of the logger code with code of the applications configured for use with the logger.

The logger includes a configuration file in which an application can define various data fields that are to be logged. The data fields can be of various types, e.g., a simple data field, a canonical data field and a derived data field. The data fields can have various properties, e.g., a name, a description, a data type and a log location indicating one or more destinations where the data fields are to be logged. One or more of the above properties can be optional. In some embodiments, a simple data field can also include a validating function that enables the logger to determine whether the value provided by the application for a particular data field is valid. In some embodiments, the canonical data fields are data fields that have the same meaning across multiple applications using the logger. That is, the canonical data fields have a "single source of truth" and the values of these data fields can be guaranteed to actually conform to what they mean. In some embodiments, the derived data fields are data fields whose values are computed by the logger on behalf of the application using a value computing function defined by the application.

Applications typically provide the data fields and their corresponding values as a set of key-value pairs to the logger. However, in some embodiments, the values of canonical and/or derived data fields are computed or retrieved by the logger on behalf of the application (into a "canonical data field" or a "derived data field," as defined below). The logger accesses a configuration file to determine how to handle logged data. Details of the configuration file are described in further detail below. Upon receiving the key-value pairs, the logger determines whether the received data fields are defined in the configuration file. If the data fields are defined in the configuration file, the logger validates the values and logs the valid values at specified data stores. In some embodiments, invalid values are logged in a separate location, e.g., a separate error table (for each logger), and/or the corresponding application is notified, e.g., via an exception. In some embodiments, data fields that are not defined in the configuration file may be logged in a separate location, e.g., an "extra_data" column of a particular table.

It should be noted that unless specified otherwise, reference to "a data field" in the entire document can mean one or more of "a simple data field," "a canonical data field," or "a derived data field".

Environment

FIG. 1 is a block diagram illustrating an environment 100 in which a logger 130 can be implemented. The environment 100 includes a client 105 that communicates with a server 120 via a communication network 115 for performing various tasks, e.g., tasks related to social networking. The environment 100 includes a logger 130 that can provide data logging functionalities to various applications, e.g., application 110 executing on a client device 105 and applications 125 executing on the server 120. In some embodiments, the logger 130 executes on the server 120. However, the logger 130 can be configured to execute on a server different from the server 120 and work with the applications and/or the server 120 to provide data logging functionalities. The logger 130 facilitates the applications to log data at multiple data stores 140. In some embodiments, the environment 100 can be a social networking environment the applications 125 can be part of a social networking application, e.g., FACEBOOK of Menlo Park Calif., application 110 can be a FACEBOOK "App."

The logger 130 includes a configuration file 135 that defines the behavior of the logger 130. An application can define, configure or customize the configuration file 135 to suit its data logging needs. For example, the application 110 may define in the configuration file 135 the data fields, including simple data fields, canonical data fields and/or derived data fields, to be logged by the logger. The application 110 may define a log location indicating one or more data stores 140 at which the data fields have to be logged. The application 110 may define, for simple data fields, validating functions that determine whether or not a given value of the data field is valid. The application 110 may define value-computing functions for the derived data fields for computing the value of the derived data fields. The application 110 may also indicate in the configuration file 135 whether to log the data fields that are not defined in the configuration file 135, etc.

The applications provide the data to be logged to the logger 130. In some embodiments, the data is provided as a set of key-value pairs that correspond to data fields and their respective values. For example, the application 110 can provide a key-value pair "User ID::Iron Man21", where "User ID" is a data field and "Iron Man21" is the value of the data field. The logger 130 performs a number of verifications on the data, including determining whether the data fields are defined in the configuration file 135, if the values of those data fields are valid, etc., before the data is logged. After the verifications are completed successfully, the logger 130 proceeds to log the values in the one or more locations specified in the configuration file 135. In some embodiments, the logger 130 can also log the data fields to which the values correspond. If the application has defined any canonical data fields or derived data fields, the logger 130 obtains the values of those data fields and logs them at the specified location as well. In some embodiments, the values of the canonical and derived data fields may not be validated. In some embodiments, the invalid values are logged in a separate location, e.g., an error table, and/or notified, e.g., via an exception, to the application. In some embodiments, the data fields that are not defined in the configuration file may be logged in a separate location, e.g., an "extra_data" column of a particular table.

A data field may be logged in one or more locations, e.g., different data stores 140. Further, different data fields may be stored at different locations. For example, a first data field may be logged in a "fourth data store," a second data field may be logged in a "third data store" a third data field may be logged in a "second data store," an "Nth data store," and so on. The application 100 can define the log location for the data fields in the configuration file 135. In some embodiments, a default data store may be chosen by the logger 130 if no log location is specified in the configuration file 135.

In some embodiments, a consumer may consume the data logged in the data stores 140 for various purposes, including analyzing the data or the environment 100. Also, a consumer of a particular data store can expect a specified set of data to be available at the data store. In some embodiments, the logger 130 performs a schema-level validation to ensure that the schema defined by the application 110 in the configuration file 135, e.g., data fields for a particular data store which can correspond to columns of a table to be generated at the particular data store, matches with a schema of the particular data store. In some embodiments, the logger 130 interacts with a metadata store (not illustrated) that contains metadata of schemas of the data stores, to compare the schemas defined by the application 110 with the schemas of the data stores. For example, if a consumer of a "First data store" expects a data field "random_text" to be available, the logger 130 ensures that the application 110 logs the "random_text" data field to the "First data store." If the configuration file 135 does not include "First data store" as one of the destination log locations for the "random_text" data field, the logger 130 will determine whether such an absence is allowed, or may raise an exception, e.g., when the configuration file 135 is validated during the generation of an instance of the logger 130.

Accordingly, by having the application 110 log data in accordance with schema definition of the destination data stores and also by providing a flexibility to log data at a data store of the application's choice and with the specified fields, as validated; the logger 130 routes the values of the data fields to the appropriate data stores 140. The logger 130 also ensures that the data is logged in the data stores 140 in a format expected by the consumers of the data stores 140.

In some embodiments, a data store is a logical container for data and can be implemented in various forms, e.g., a database, a file, a data structure, etc. Examples of the data store can include databases or database management systems such as Apache Hive, Scuba from Facebook of Menlo Park Calif., Operational Data Store (ODS), Scribe, etc.

In some embodiments, the applications may interact with the logger 130 via an application-programming interface (API) provided by the logger 130. For example, the logger 130 includes APIs for generating a default configuration file and APIs for further customizing the default configuration file to a configuration file 135 as per the data logging needs of the application 110. The logger 130 can also include APIs for defining data fields, setting validating functions, generating an instance of the logger 130 based on the configuration file 135, etc. The logger 130 can also include a data logging API which the application 110 can use for logging data. For example, "log ($data)," where "$data" is a set of data field names and their corresponding values provided by the application 110 as key-value pairs. The logger 130 can be implemented in various programming languages, including PHP (Personal Home Page or PHP: Hypertext Preprocessor), but via the API is not limited to one programming language.

Referring back to the configuration file 135, different applications may define the configuration file 135 in different ways. For example, while application 110 configures the configuration file 135 to log three data fields, a first data field at the "fourth data store," a second data field at the "third data store" and a third data field at the "second data store" and "Nth data store," one of the applications 125 may configure the configuration file 135 to log five data fields, all at "first data store." Further details regarding the configuration file 135 are discussed at least with reference to FIGS. 2 and 3.

Figure 2:
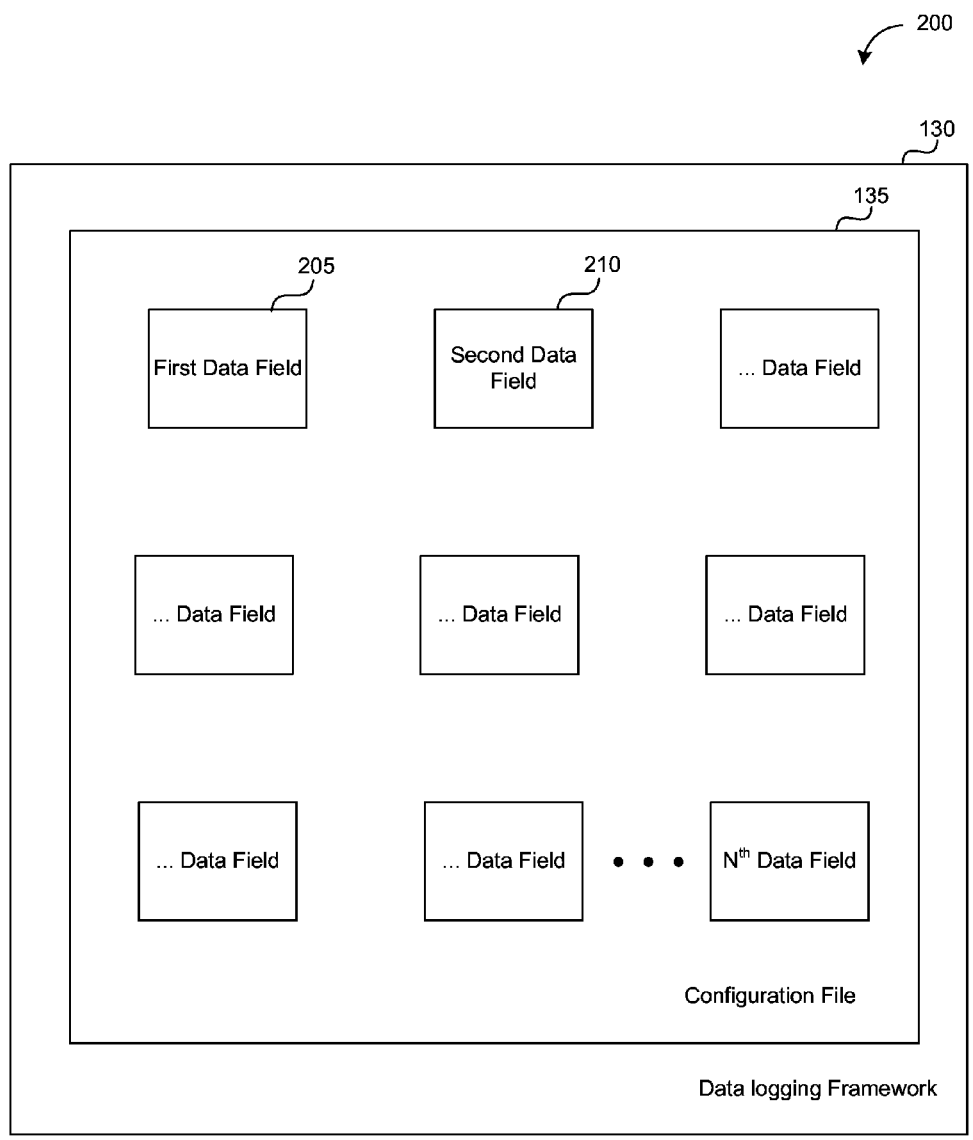
FIG. 2 is a block diagram of the configuration file used to define a behavior of the logger, consistent with various embodiments of the disclosed technology.

FIG. 2 is a block diagram of the configuration file 135 used to define a behavior of the logger 130, consistent with various embodiments of the disclosed technology. The configuration file 135 can store information regarding the data fields, including simple data fields, canonical data fields, and/or a derived data fields, that an application is configured to log using the logger 130, a location at which the data fields should be logged, validating functions for simple data fields to determine whether or not a given value of a data field is valid, functions for computing the value of the derived data fields, an indication regarding whether to log the data fields that are not defined in the configuration file 135, etc.

Figure 3A:
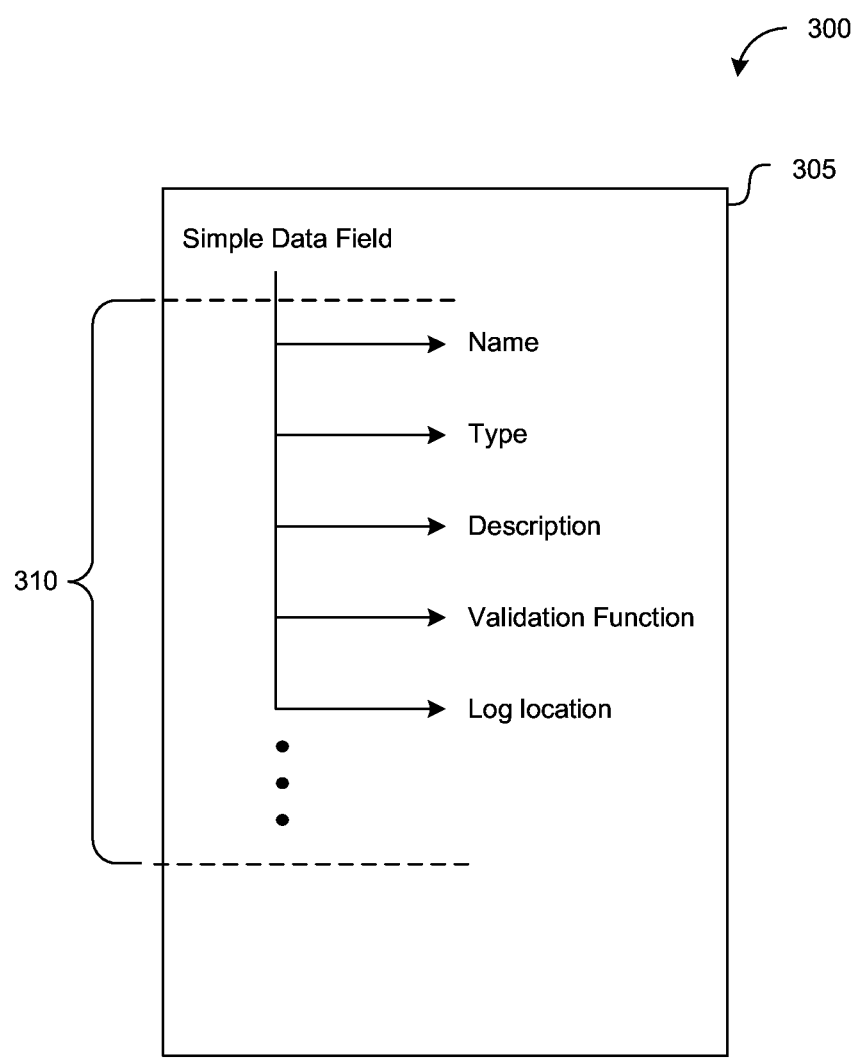
FIGS. 3A, 3B and 3C, collectively referred to as FIG. 3, illustrate examples of various data fields that can be defined in the configuration file, consistent with various embodiments of the disclosed technology.
Figure 3B:
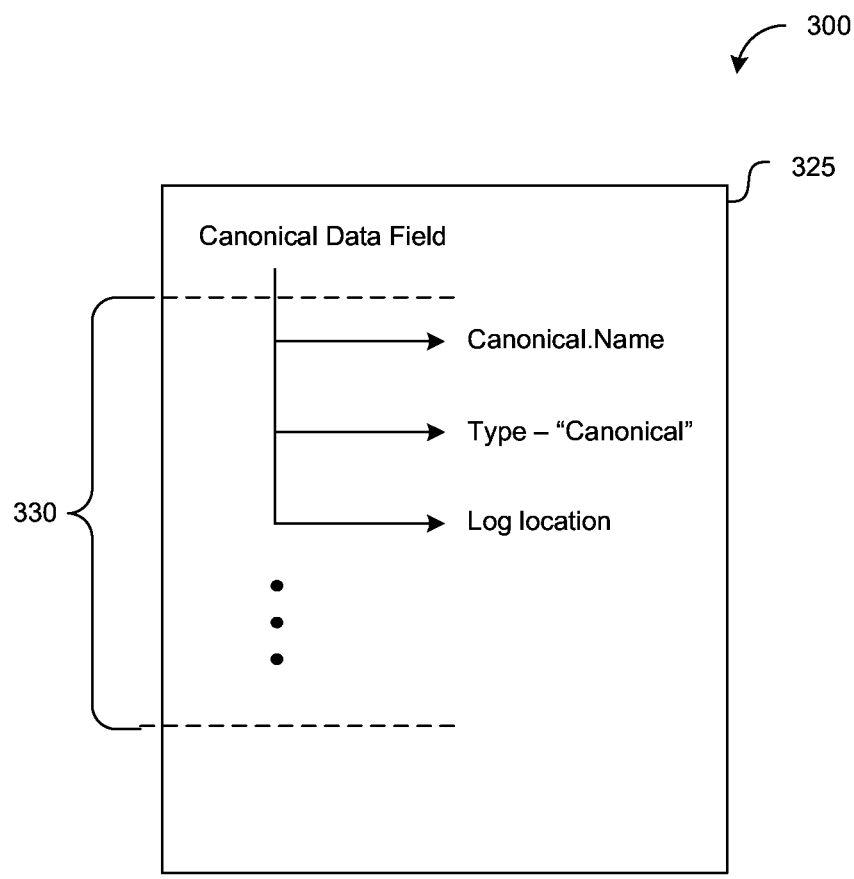
Figure 3C:
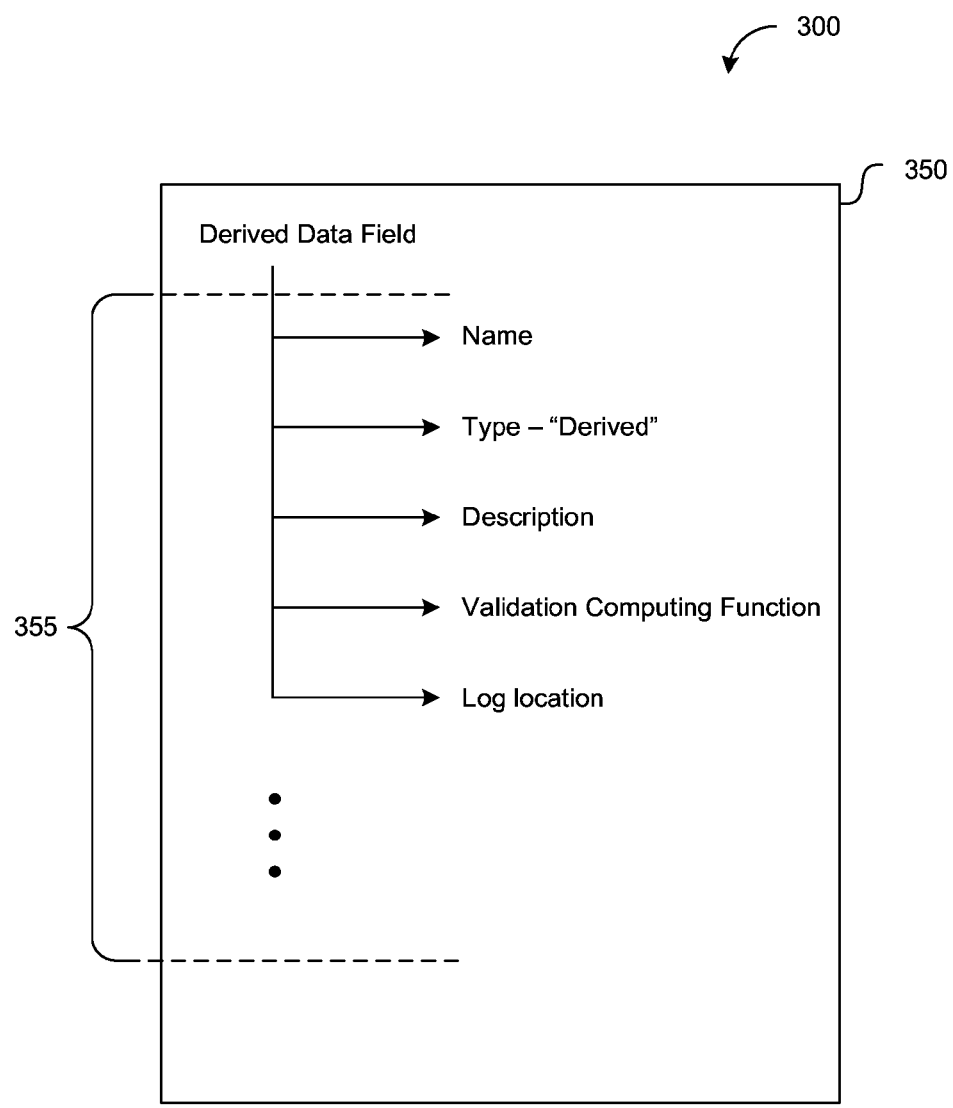

The applications can configure the configuration file 135 to suit their data logging needs. For example, the application 110 may define in the configuration file 135 a number of data fields, including a first data field 205 and a second data field 210, to be logged at the data stores 140. The data fields can include a number of properties that describe various aspects of the data fields. FIGS. 3A, 3B and 3C illustrate an example 300 of various data fields that can be defined in the configuration file 135.

A simple data field, e.g., data field 305 has a number of properties 310, including a name of the data field 305, a type of the data field 305, a description the data field 305, a validation function of the data field 305, a log location, etc. In some embodiments, the name could be an identification (ID) of the data field. The type of the data field can be a data type, e.g., integer, string, array, float, Boolean, user defined data types, complex data types, e.g., vector, set, map, etc. The description can be a set of words that describe the data field 305. The validating function can be a function that determines whether a value provided by the application for the data field 305 is valid. In some embodiments, the validating function can be added to a data field using a validator API, e.g., addValidator(SomeClass::validatorMethod), where "SomeClass" is a programming language class having a method "validatorMethod" which includes the logic for determining whether or not a value is valid. The log location can include information regarding one or more of a data store, a table of a data store, a column in a table of a data store etc. where the value of the data field is to be logged.

An example of a data field 305 can be an "age" data field of a social networking application. The name or ID of the "age" data field can be "_age," a type can be integer, the description can be "age of the user," the validating function can include a function that determines that null values and/or values that are not greater than "0" are invalid for the "age" data field. The validating functions can be provided by the application 110, the logger 130, or by some unrelated data evaluation system. In some embodiments, the application 110 may customize a validating function provided by the logger 130.

The logger 130 also supports a "canonical data" field 325. In some embodiments, a canonical data field is a data field that has a same meaning and is of a same data type across multiple applications that are using the logger 130. For example, consider that the server 120 of FIG. 1 is a social networking server executing various social networking applications 125 of a social network, e.g., FACEBOOK of Menlo Park Calif. The applications 125 can include a photo uploading application, a photo sharing application, a timeline updating application, a status notification application etc. The application 110 can be a FACEBOOK "App" executing on a mobile device 105 of a user. One or more applications 125 receive data from the application 110, process the data if necessary, and log the data via the logger 130.

An example of a canonical data field in the social networking application can be a user ID data field, a timestamp data field, a browser type of the client 105, etc. The user ID data field should mean and be the same across all of the applications 125. That is, if a user ID in the social networking application is defined as a string and is defined in a certain fashion for a user, e.g., name of the user appended with a non-repeating random number, the user ID data field should be of the same type across the social networking applications 125. No individual application in the applications 125 may define the user ID data field as an integer or any other data type. It may not be different for different applications. That is, the canonical data fields have a single source of truth and the values of these data fields actually conform to what they mean and is consistent with what is defined by the social networking application.

To log a value of the canonical data field 325, an application can specify the name of the canonical data field 325 in the configuration file 135. The application may not provide data to the canonical data field 325, nor the value of the canonical data field 325, as the canonical data field 325 means the same and is consistent across multiple applications: the logger 130 obtains the value of the canonical data field 325 from a predefined source of truth and logs the value accordingly. For example, to log a user ID of a current user of an application 110, the application 110 adds the user ID canonical data field to the configuration file 135, and when the logger 130 is invoked by the application to log the values of other data fields, e.g., via "log ($data)" API, the logger 130 identifies the user ID canonical data field defined in the configuration file 135 and obtains the value of the current user ID from a predefined source and logs it (along with values of other data fields specified in "$data"), at a specified data store.

In some embodiments, by defining some of the data fields as canonical data fields, a potential inconsistency that may be caused by different applications 125 defining data fields that have the same meaning across the applications 125 in different ways is eliminated.

Since a value of the canonical data field 325 is obtained by the logger 130 instead of the applications 125 providing the value to the logger 130, in some embodiments, it is beneficial to developers of the applications 125 since they do not have to include the code for obtaining the value. This can reduce the size of the code of the applications 125 significantly, especially if the canonical data field 325 is logged at multiple places in the code or if multiple applications are logging the canonical data field.

Further, an additional advantage can include that the value of certain canonical data fields is more current when the logger 130 obtains the value rather than the applications 125 providing the value. For example, consider a timestamp canonical data field that indicates a time at which the timestamp data field is used. An application, e.g., application 110, intending to log the time at which a particular data field is logged can log the time in at least two ways: (1) by obtaining the time from the timestamp field and passing the time to the data logging API, e.g., log ($data); or (2) by having the timestamp data field defined as a canonical data field in the configuration file 135, in which case the logger 130 obtains the value at the time of logging the "$data" to the specified data stores 140. If there is a delay between the application 110 obtaining the time and when the logger actually logs the "$data," then the time provided by the application 110 may not be current. Accordingly, the values of certain canonical data fields can be more precise or current when obtained by the logger 130 as compared with the application 110 providing the values, as the application 110 may delay logging until some later time.

A user, e.g., an administrator of logger 130, can define a set of data fields in the applications 125 and application 110 as a canonical data field 325. An application can add a canonical data field 325 to the configuration file 135, by specifying a name, a type and a log location of the canonical data field 325, as shown by the properties 330 of the canonical data field 325. In some embodiments, the logger 130 may include a tool that provides a list of canonical data fields that are available for logging. The application 110 can select one or more canonical data fields from the list and add them to configuration file 135. In some embodiments, the logger 130 provides an API for adding canonical data fields to the configuration file 135. An example API for adding canonical data fields can include "fd->canonical($data_field)", where "fd" indicates "field definition," "$data_field" can be user ID, timestamp etc. A canonical data field can be represented in the configuration file 135 in various ways, e.g., a name of the canonical data field can include "canonical," a type can be "canonical" etc., or in any other suitable way that indicates to the logger 130 that the data field is a canonical data field.

The logger 130 also supports a derived data field 350. A derived data field is a data field whose value is computed using a value computing function. The value computing function may be defined by the logger 130 or by the application 110. Further, the application 110 can customize or modify the value computing function provided by the logger 130 to suit its data logging needs. An example of a derived data field 350 can include an age data field whose value indicates an age of a user of the application 110, even if the user's identifier, but not their age, is not specified by the application 110. A value computing function can be defined to compute/derive the value of the age using a current date and a date of birth of the user, even if said user's identifier is not recorded. In some embodiments, the value of a derived data field is computed by the logger 130.

In some embodiments, the value of the derived data field 350 can be dependent on one or more of the values of other data fields defined in the configuration file 135. When the logger 130 receives those values of the other data fields, e.g., via the data logging API "log ($data)," the logger 130 computes the value of the derived data field 350 based on the values provided in the "$data" and using the value computing function specified in the configuration file 135.

The derived data filed 350 has a set of properties 355, including a name, a type, a description, a value computing function to compute the value of the derived data field 350, a log location that indicates the location of a data store where the value has to be logged. A derived data field 350 can be represented in the configuration file 135 in many ways, including denoting the type of the data field as "derived."

Referring back to the configuration file 135 in FIG. 2, an application, e.g., application may define various data fields in the configuration file 135 as described above. For example, the first data field 205 can be a "photo ID" of a photo uploaded by a user in the social networking application, the second data field 210 can be a canonical data field such as a user ID, etc. After successfully configuring the configuration file 135, the application 110 can create an instance of the logger 130 based on the configuration file 135. The application 110 can then use the logger 130 to log the data at the data stores 140 via the data logging API, e.g., log ($data).

When the logger 130 receives the data form the application 110, the logger 130 determines whether the data fields in the received "$data" are defined in the configuration file 135. For the data fields that are defined in the configuration file 135, the logger 130 determines if the values of those data fields are valid, e.g., using a validating function specified in the properties of the data field, and if they are valid, proceeds to log the values in the location specified in the properties of the data fields. If the application has defined any canonical data fields and/or derived data fields in the configuration file 135, the logger 130 obtains the values of those data fields and logs them at the specified location as well.

If the logger 130 determines that the data fields in the received "$data" are not defined in the configuration file 135, the logger 130 can either drop those data fields, that is, not log those data fields, or log them at a separate location meant for storing the data fields that are not defined in the configuration file 135. In some embodiments, the logger 130 determines whether to drop the data field or log it in a separate location based on whether the application 110 has indicated in the configuration file 135 to store the undefined data fields. For example, the application 100 may indicate to store the undefined data fields in a separate location by specifying or defining an "extra_data" canonical data field. The logger 130 considers any data field that is not defined in the configuration file 135 as an extra_data data field and logs at a predetermined location meant for storing the contents of extra_data field. The location where extra_data field is stored can be of a number of types, including a separate data store, a separate table in a particular data store, or a separate column in a particular table.

Figure 4:
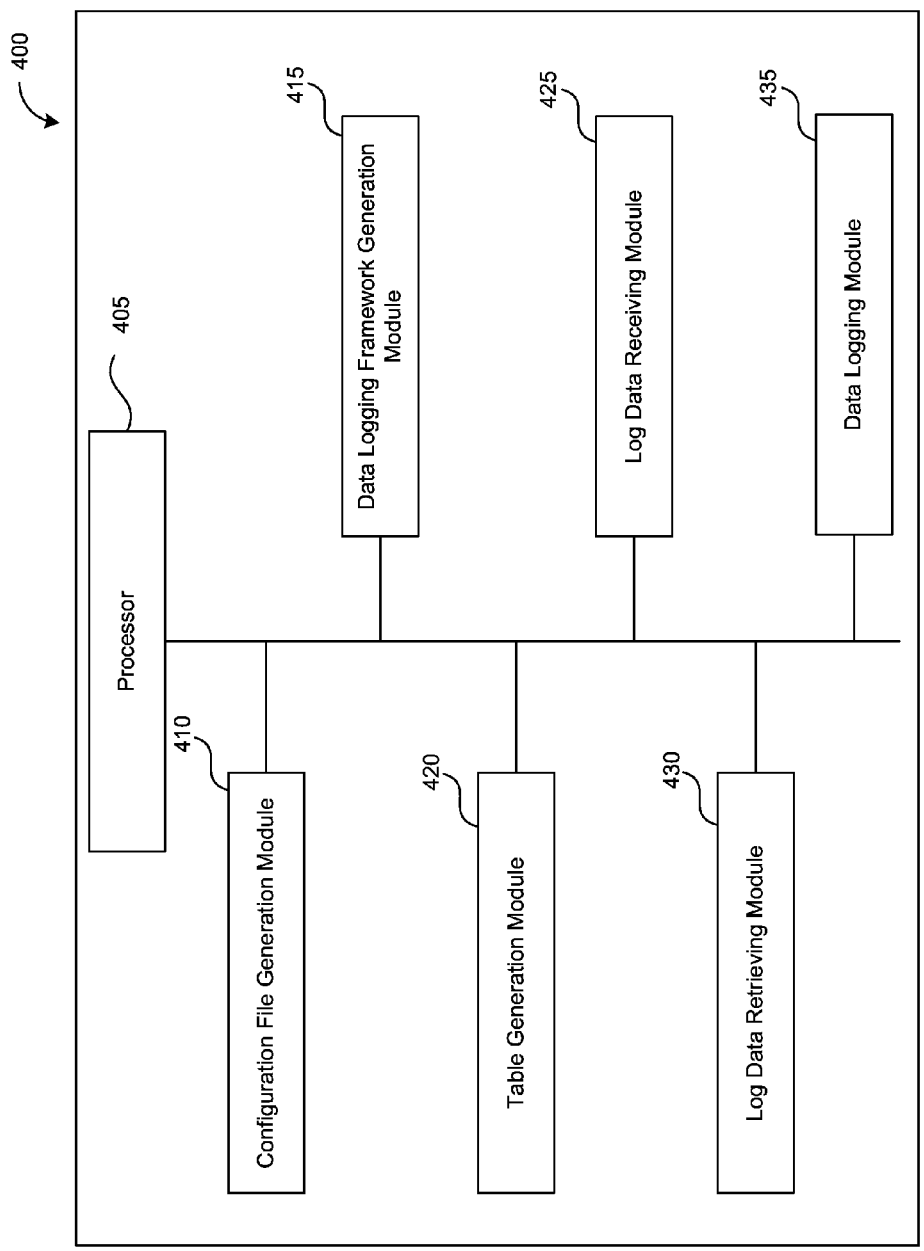
FIG. 4 is a block diagram of a system for implementing the logger, consistent with various embodiments of the disclosed technology.

FIG. 4 is a block diagram of a system 400 for implementing a logger 130, consistent with various embodiments of the disclosed technology. The system 400 has various components, including a configuration file generation module 410, a logger generation module 415, a table generation module 420, a log data receiving module 425, a log data retrieving module 430 and a data logging module 435 that work in cooperation with the processor 405 to perform various functions, including generating the logger 130 based on the configuration file 135 and logging the data provided by an application.

The configuration file generation module 410 generates a configuration file, e.g., configuration file 135, which can define the behavior of a logger, e.g., logger 130. The configuration file generation module 410 can be configured to generate a default configuration file that includes a set of default data fields that a particular application, e.g., application 110, may generally prefer to log. The data fields can be of various types and can include various properties as described at least with reference to FIG. 3. The application 110 can further customize or configure the default configuration file to suit its data logging needs to generate the configuration file 135.

The configuration file generation module 410 also generates APIs that can be used by the application 110 to configure the configuration file 135 appropriately. For example, the APIs can include APIs for setting the owner of the configuration file 135, setting a specific sub-database where the data is stored, e.g., for tables in a large-scale database which sub-part of the database the data will be stored in, setting the table names, defining the data fields, etc. The configuration file 135 can be generated in various programming languages, such as PHP.

The logger generation module 415 creates an instance of the logger 130 based on the generated configuration file 135. In some embodiments, generating an instance of the logger 130 includes generating an object of the programming language classes forming the logger 130. The configuration file 135 is an integral part of the logger and plays a significant role in defining the behavior of the created instance of the logger. Once an instance of the logger 130 is created, the application 110 may use the instance to invoke the data logging API, e.g., "log ($data)" where "log" is a method to log the data and "$data" includes the data fields and their corresponding values as key-value pairs.

A particular data field is logged at one or more locations specified in the properties of the data field in the configuration file 135. The logger 130 ensures that the data fields and their values are logged in the right location and in the right format at the data stores 140. The table generation module 420 sets up the data stores 140, including generating data containers, e.g., tables, to log the values of the data fields provided by the application 110. In some embodiments, generating a table to store the provided values of the data fields include generating a column in the table for each of the data fields that are to be logged at a particular data store. For example, if the configuration file 135 includes two data fields "User ID" and "Gender" that are to be logged at "First data store," and two data fields "Age" and "Relationship Status" at "Second data store," the table generation module 420 can create a table at "First data store" having columns "User ID" and "Gender" and a table at "Second data store" having columns "Relationship Status" and "Age." The values of the data fields are logged at the respective columns of the table at the respective data stores.

In some embodiments, the table generation module 420 may also create additional columns. These additional columns may be created for various reasons, including to comply with the table creation rules of the destination data store. An example of an additional column can include a "date" column, or an anonymized version of a User ID.

In some embodiments, the table generation module 420 validates the configuration file 135 by performing a schema-level validation. The schema-level validation can include determining whether the schema defined by the application 110 in the configuration file 135 matches with a schema definition of a particular data store where the data fields are logged. In some embodiments, the schema definition includes names of the tables, columns, data types of the data stored at the particular data store, schema rules, e.g., a format of a name of a table, the number of columns in the table, possible data types of a column, mandatory columns, etc. The table generation module 420 obtains the schema definition defined by the application 110 in the configuration file 135, e.g., columns of a table to be generated at the particular data store for storing the values of the corresponding data fields, and verifies if the schema definition is compliant with the schema definition of the particular data store. In some embodiments, the logger 130 may obtain the schema definition of the particular data store from a metadata store (not illustrated). If the schema definition is compliant, the table generation module 420 generates the necessary tables and columns at the data stores 140; if it is not compliant, the data are stored In a separate data store, i.e., an error table.

In some embodiments, the schema-level validation is performed before an instance of the logger 130 is created.

The log data-receiving module 425 receives the data sent from the application 110, e.g., via "log ($data)" API. In some embodiments, the "$data" can be a set of key-value pairs that represent the data fields and their corresponding values. The log-data receiving module 425 parses the received data to extract the various data fields and their corresponding values, and passes them to the data logging module 435 for logging the values. The data logging module 435 logs the values at one or more data stores associated with the data fields, for example, in the tables created by the table generation module 420 at the data stores 140.

In some embodiments, the application 110 does not provide the values for certain data fields, e.g., derived data fields and canonical data fields. The log-data retrieving module 430 retrieves or computes the values for those data fields on behalf of the application 110. The log data retrieving module 430 computes those values based on the value computing functions associated with the respective data fields that are defined in the configuration file 135. After computing the values, the log-data retrieving module 430 passes the values to the data logging module 435 which logs the values at one or more data stores associated with the data fields.

Figure 5:
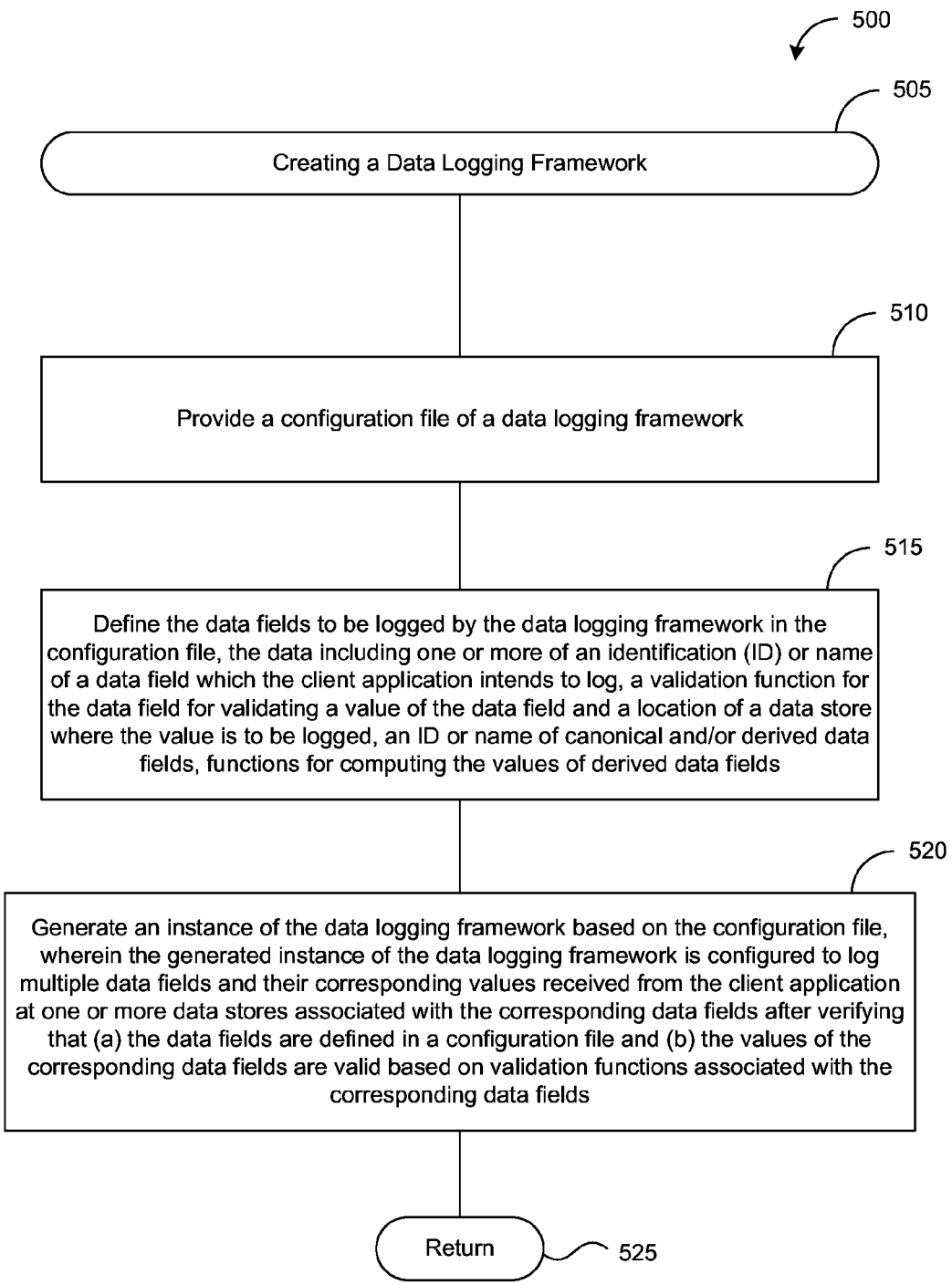
FIG. 5 is a flow diagram of a process for creating the logger, consistent with various embodiments of the disclosed technology.

FIG. 5 is a flow diagram of a process 500 for creating a logger, consistent with various embodiments. The process 500 may be executed in a system such as system 400 of FIG. 4 and can be used in an environment such as environment 100 of FIG. 1. The process 500 beings at block 505, and at block 510, a configuration file generation module 410 provides a configuration file of a logger to a client application. In some embodiments, the configuration file defines the behavior of the logger, including specifying where and what data fields are logged.

At block 515, the client application can define the data fields to be logged by the logger in the configuration file. The client application may use the API of the configuration file to define the data fields. In some embodiments, defining any of the simple, canonical, or derived data field includes defining one or more of an ID or name of the data field which the client application intends to log, a description of the data field and a log location that indicates one or more data stores where the value of the data field is to be logged.

In some embodiments, defining the simple data field further includes defining a data type of the data field, a validation function for determining whether or not a value of the data field is valid.

In some embodiments, defining the canonical data field includes adding a canonical data field in the configuration file 135 from a given set of canonical data fields. A canonical data field is a data field that has a same meaning and is of same data type across multiple client applications that are using the logger. In some embodiments, the logger 130 may provide a list of canonical data fields that are available for logging and the client application can select one or more canonical data fields from the list and add to the configuration file 135.

In some embodiments, defining the derived data field includes defining a value computing function for the derived data filed which can be used to compute the value of the derived data field. The value-computing function may be provided by the client application or the logger 130. In some embodiments, the value of the derived data field can be dependent on one or more of the values of other data fields defined in the configuration file 135. The logger 130 computes the value of the derived data field based on those values, which are provided by the client application via the "log($data)" API, and using the value computing function associated with derived data field.

At block 520, the logger generation module 415 generates an instance of the logger 130 based on the configuration file 135, and the process returns at block 525. The generated instance of the logger 130 is configured to log values of multiple data fields received from the client application at one or more data stores associated with the corresponding data fields. In some embodiments, the logger 130 verifies that (a) the data fields are defined in a configuration file and (b) the values of the corresponding data fields are valid based on validation functions associated with the corresponding data fields before logging the values.

In some embodiments, prior to generation of the instance of the logger, the table generation module 420 performs a schema level validation to confirm if a schema defined by the client application for a particular data store is compliant with schema definition of the particular data store, and upon confirmation, creates the necessary tables at the particular data store.

Those skilled in the art will appreciate that the logic illustrated in FIG. 5 and described above, and in each of the flow diagrams discussed below, may be altered in various ways. For example, the order of the logic may be rearranged, substeps may be performed in parallel, illustrated logic may be omitted where unnecessary, other logic may be included in order to render the process more efficient, etc.

Figure 6:
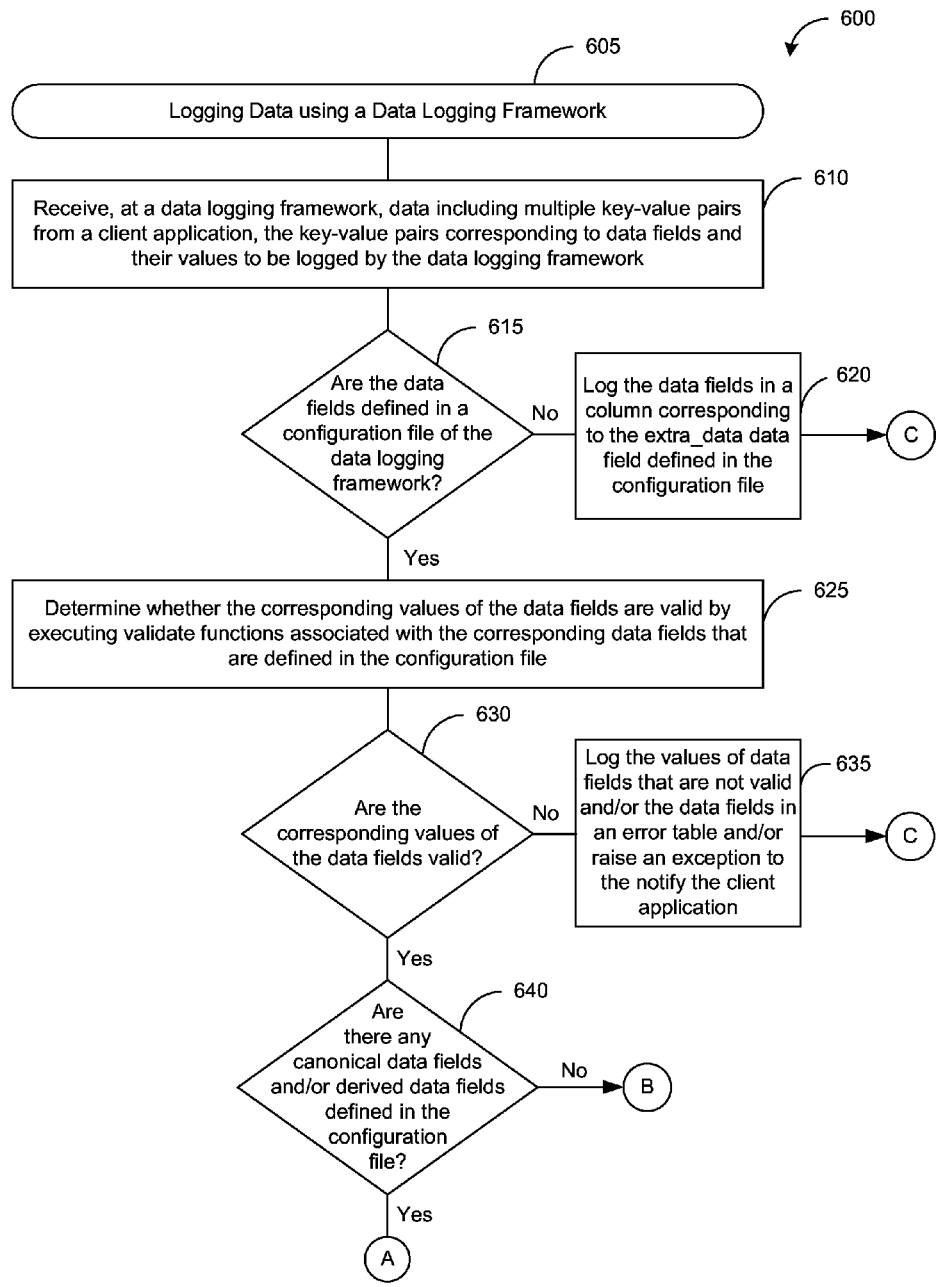
FIG. 6 is a flow diagram of a process for logging data using the logger, consistent with various embodiments of the disclosed technology.
Figure 6:
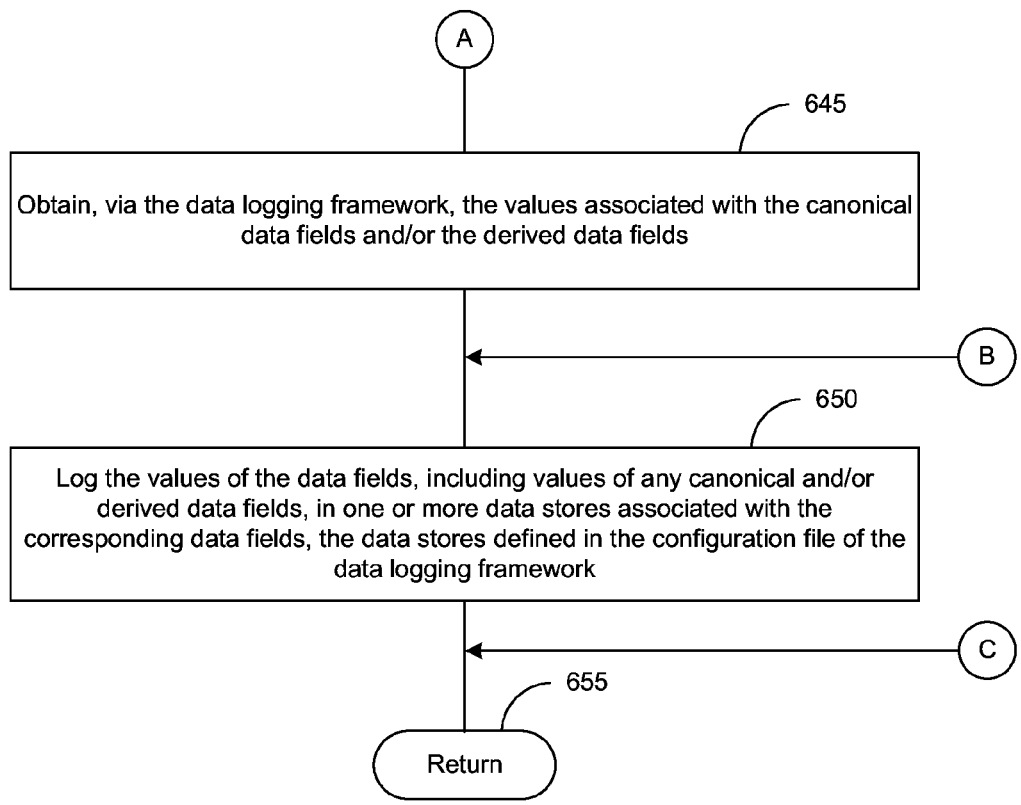

FIG. 6 is a flow diagram of a process 600 for logging data using a logger, consistent with various embodiments. In some embodiments, the process 600 may be implemented using a system such as system 400 of FIG. 4 and in an environment such as environment 100 of FIG. 1. The process 600 begins at block 605, and at block 610, the log data-receiving module 425 receives data, including multiple data fields and their corresponding values from a client application, e.g., application 110 to be logged at one or more data stores.

In some embodiments, the data fields and their corresponding values are sent as key-value pairs to the logger 130. The log data-receiving module 425 parses the key-value pairs to obtain the data fields and their corresponding values.

At decision block 615, the data-logging module 435 determines whether the data fields are defined in the configuration file 135. Responsive to a determination that the data fields are not defined in the configuration file 135, at block 620, the data logging module 435 logs the values of those data fields that are not defined in the configuration file 135 in a location corresponding to the extra_data canonical data field defined in the configuration file. The extra_data canonical data field can be generated as a column in a table, as a separate table etc. in one or more data stores.

In some embodiments, if the extra_data canonical data field is not defined in the configuration file 135, the values of the data fields that are not defined in the configuration file 135 are dropped by the data-logging module 135. That is, those values are not logged at any of the data stores.

In some embodiments, the values stored in the data stores are anonymized. That is, if the values stored contain any user identifiable information, e.g., user ID, IP addresses, browser cookies, email addresses, full names, phone numbers, etc. are deleted or transformed before they are logged. The anonymization process may be configured to delete specific user identifiable information while retaining other user identifiable information. In some embodiments, fields may self-destruct, that is, the field has a predefined data retention period, e.g., up to 3 months. The contents of the field are deleted at the expiry of the retention period. Further, the retention period can be different for different data stores.

Referring back to decision block 615, responsive to a determination that the data fields are defined in the configuration file 135, at block 625, the data-logging module 435 proceeds to determine whether the values of the data fields are valid. The data-logging module 435 determines whether the value of a particular data field is valid by using the validation function of the data field defined in the configuration file 135.

At decision block 630, the data-logging module 435 determines whether the values are valid. Responsive to a determination that the values of one or more data fields are not valid, at block 635, the data logging module 435 logs the values of those one or more data fields in an error table and/or raises an exception to the notify the client application.

Responsive to a determination that the values of the data fields are valid, at decision block 640, the data-logging module 435 determines whether there are any canonical data fields and/or derived data fields defined in the configuration file 135. Responsive to a determination that there are no canonical data fields and/or derived data fields defined in the configuration file 135, the process 600 proceeds to block 650 to log the values of the data fields.

On the other hand, responsive to a determination that the configuration file 135 includes canonical data fields and/or derived data fields, at block 645, the log-data retrieving module 430 obtains the values associated with the canonical data fields and/or the derived data fields. For obtaining or computing the values of the derived data fields, the log data retrieving module 430 uses the value computing function defined for the corresponding derived data fields.

At block 650, the data logging module 435 logs the values of the data fields, including any canonical and/or derived data fields, in one or more data stores associated with the corresponding data fields, and the process returns at block 655. In some embodiments, a particular data field may be stored in one or more data stores.

In some embodiments, the logger 130 also provides additional features such as sampling and gating. In some embodiments, sampling is a process that specifies the rate at which data is logged at a particular data store. For example, a sampling rate can specify that 1% of all rows are logged at "Data Store A," 2% of all rows are logged at "Data Store B," etc. The configuration file 135 provides APIs that enables the client application to specify the sampling rate. The sampling rate can also be specified as a function of various user defined parameters.

In some embodiments, gating is a process that determines whether a particular data field is to be logged. For example, gating process can specify that a user ID data field should not be logged if the value of the user ID data field is or contains "Darth Vader." The configuration file 135 provides APIs that enables the client application to specify the gating values or systems. The gating values can also be specified as a function of various user-defined parameters.

Figure 7:
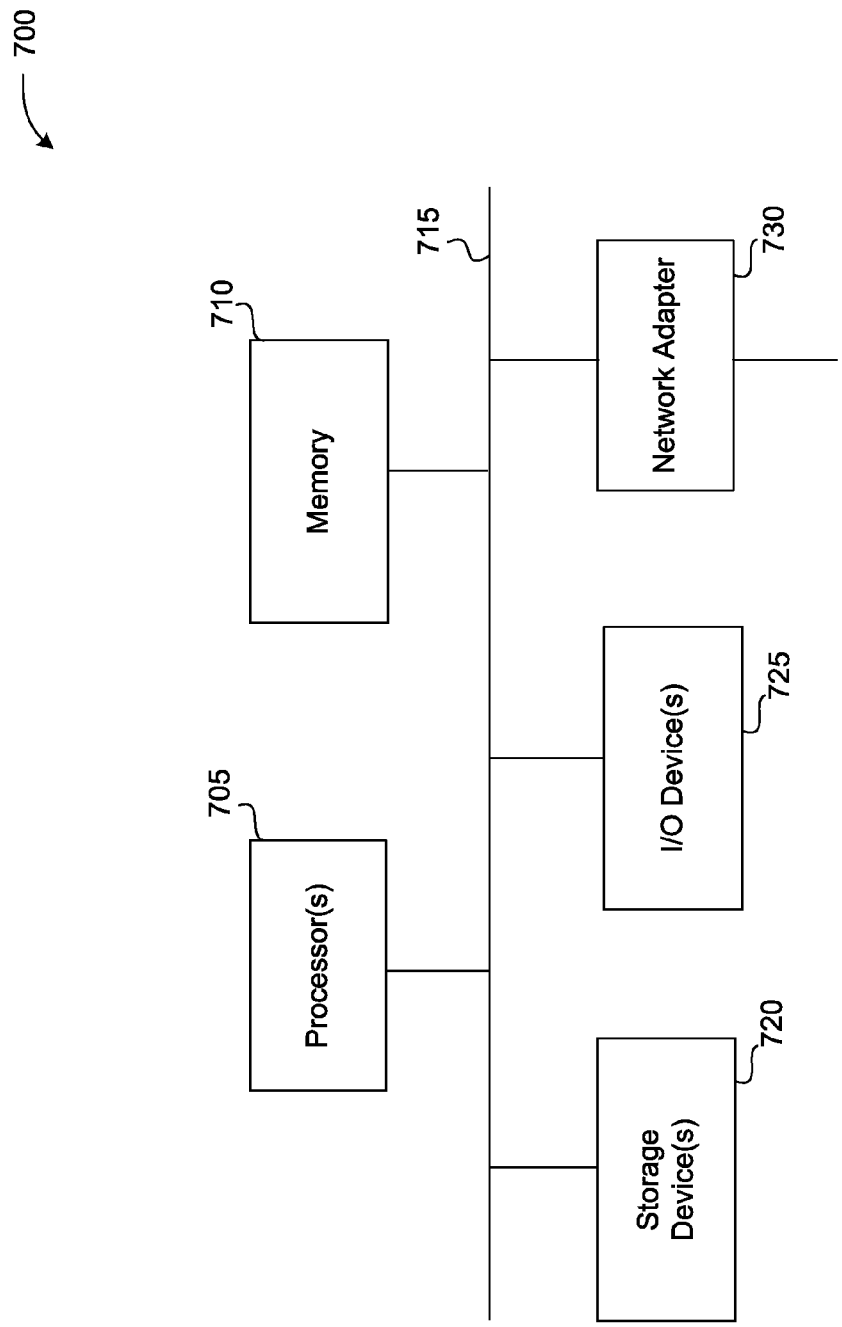
FIG. 7 is a block diagram of a computer system as may be used to implement features of some embodiments of the disclosed technology.

FIG. 7 is a block diagram of a computer system as may be used to implement features of some embodiments of the disclosed technology. The computing system 700 may be used to implement any of the entities, components or services depicted in the examples of FIGS. 1-6 (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing device, comprising:
   receiving, at a data logging framework executing at the computing device and from a client application, data including multiple key-value pairs;
   determining, by the data logging framework, whether multiple data fields corresponding to multiple keys of the key-value pairs are defined in a configuration file of the data logging framework;
   responsive to a determination that the data fields are defined in the configuration file, determining, by the data logging framework, whether values of the corresponding data fields are valid, the determining including executing validator functions associated with the corresponding data fields, the validator functions defined in the configuration file of the data logging framework;
   responsive to a determination that the values of the corresponding data fields are valid, logging the values in a data store associated with the corresponding data fields, the data store defined in the configuration file of the data logging framework;
   determining, by the data logging framework, whether the configuration file includes a canonical data field that has the same meaning globally across multiple client applications using the data logging framework;
   responsive to a determination that the configuration file includes the canonical data field, obtaining, by the data logging framework using information provided in the configuration file of the data logging framework, a value of the canonical data field; and
   logging the value of the canonical data field in a second data store that is associated with the canonical data field.

2. The method of claim 1, further comprising setting up a table within the data store.

3. The method of claim 2, further comprising generating a column in the table for each of the multiple data fields.

4. The method of claim 1, wherein the configuration file includes a derived data field, the derived data field being a data field whose value is computed via a function defined by the client application to generate a derived value.

5. The method of claim 4, wherein the function computes the derived value as a function of one or more of the data fields.

6. The method of claim 4, wherein the function computes the derived value at the time of logging the values.

7. The method of claim 1, wherein logging the values further includes:
   determining, by the data logging framework, whether the configuration file includes a derived data field;
   responsive to a determination that the configuration file includes the derived data field, computing, by the data logging framework, a value of the derived data field via a function associated with the derived data field to generate a derived value; and
   logging the derived value of the derived data field in a third data store that is associated with the derived data field.

8. The method of claim 1, wherein the configuration file includes an extra data field, the extra data field configured to create an extra data column in a table at the data store to store values of data fields that are not defined in the configuration file.

9. The method of claim 8 further comprising:
   responsive to a determination that the data fields are not defined in the configuration file, logging the values in the extra data column of the table at the data store.

10. The method of claim 1 further comprising:
    responsive to a determination that the values of the corresponding data fields are invalid, logging the values in an error table at the data store.

11. The method of claim 1 further comprising:
    responsive to a determination that the values of the corresponding data fields are invalid, generating, by the data logging framework, an exception indicating the values are invalid; and
    notifying, by the data logging framework, the client application of the exception.

12. The method of claim 1, wherein logging the values and the corresponding data fields includes:
    determining, by the data logging framework, whether the configuration file conforms to a schema definition, the schema definition including at least (a) names of the data fields to be logged and (b) specific data stores where the data fields are to be logged; and
    responsive to a determination that the configuration file conforms to the schema definition, creating tables at the specific data stores, the tables containing columns corresponding to the data fields.

13. The method of claim 1, wherein the validation functions are defined by the client application.

14. The method of claim 1, wherein the validation functions are defined by the data logging framework.

15. A computer-readable storage medium storing instructions, comprising:
    instructions for providing a configuration file to a client application, the configuration file configured to receive from the client application data including multiple key-value pairs; and
    instructions for generating a data logging framework based on the configuration file, the data logging framework configured to:
        determine whether multiple data fields corresponding to multiple keys of the key-value pairs are defined in the configuration file;
        responsive to a determination that the data fields are defined in the configuration file, determine whether values of the corresponding data fields are valid, the determining including executing validator functions associated with the corresponding data fields, the validator functions defined in the configuration file of the data logging framework;
        responsive to a determination that the values of the corresponding data fields are valid, log the values in a data store associated with the corresponding data fields, the data store defined in the configuration file of the data logging framework;
        determine whether the configuration file includes a canonical data field that has the same meaning globally across multiple client applications using the data logging framework;
        responsive to a determination that the configuration file includes the canonical data field, obtain, using information provided in the configuration file of the data logging framework, a value of the canonical data field; and
        log the value of the canonical data field in a second data store that is associated with the canonical data field.

16. The computer-readable storage medium of claim 15, wherein the configuration file is further configured to receive a derived data field whose value is computed via a function defined by the client application.

17. A system, comprising:
    a processor;
    a configuration file generation module that works in cooperation with the processor to generate a configuration file;
    a log data receiving module to receive data including multiple key-value pairs from a client application; and
    a data logging framework generation module that works in cooperation with the processor to generate a data logging framework based on the configuration file, the data logging framework configured to:
        determine whether multiple data fields corresponding to multiple keys of the key-value pairs are defined in the configuration file;
        responsive to a determination that the data fields are defined in the configuration file, determine whether values of the corresponding data fields are valid, the determining including executing validator functions associated with the corresponding data fields, the validator functions defined in the configuration file of the data logging framework;
        responsive to a determination that the values of the corresponding data fields are valid, log the values in a data store associated with the corresponding data fields, the data store defined in the configuration file of the data logging framework;
        determine whether the configuration file includes a canonical data field that has the same meaning globally across multiple client applications using the data logging framework;
        responsive to a determination that the configuration file includes the canonical data field, obtain, using information provided in the configuration file of the data logging framework, a value of the canonical data field; and
        log the value of the canonical data field in a second data store that is associated with the canonical data field.

18. The system of claim 17 further comprising:
a table generation module to generate one or more tables at the data store based on the configuration file.

19. The system of claim 18, wherein:
the table generation module validates the configuration file by performing a schema-level validation.

20. The system of claim 17 further comprising:
a data retrieving module to retrieve a value associated with a derived data field whose value is computed via a function defined by the client application.

* * * * *